Figure 1:
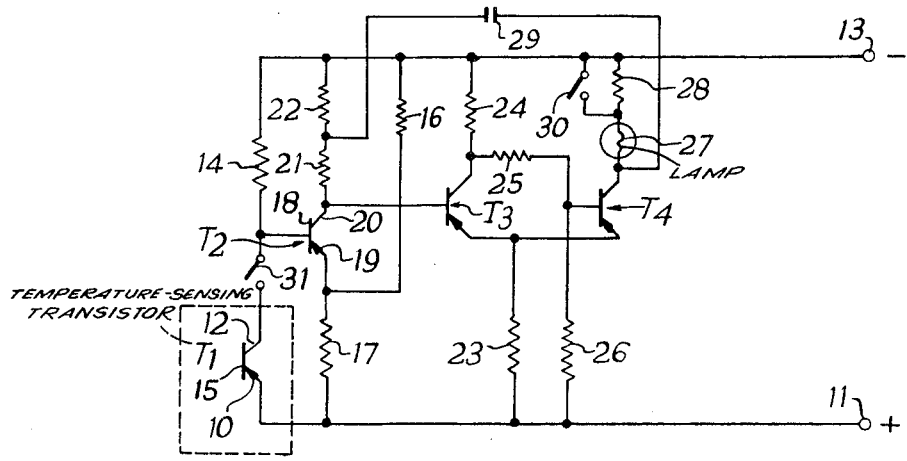

Feb. 22, 1966   J. A. IRVINE   3,237,156
TEMPERATURE-INDICATING DEVICE
Filed July 19, 1962

INVENTOR
John Anderson Irvine
BY
Curtis, Morris & Safford
ATTORNEYS

United States Patent Office 3,237,156
Patented Feb. 22, 1966

3,237,156
TEMPERATURE-INDICATING DEVICE
John Anderson Irvine, Edinburgh, Scotland, assignor to Findlay, Irvine Limited, Edinburgh, Scotland, a British company
Filed July 19, 1962, Ser. No. 210,895
Claims priority, application Great Britain, July 26, 1961, 27,134/61
7 Claims. (Cl. 340—57)

This invention relates to a device for warning a motorist of any risk of ice on the road by giving an indication of the temperature conditions near tthe ground.

The device comprises a temperature-sensitive electronic element adapted to be mounted on the structure of a motor vehicle near to the ground and so connected into a circuit as, in operation, to cause a lamp in the circuit to light up when the ambient temperature at the said element falls to a predetermined value at or near the freezing point of water.

The said circuit is preferably bistable, giving clear-cut on and off conditions for the lamp. The bistable circuit can be arranged to be off above a first predetermined temperature (say 34° F.) and on below a second, lower, predetermined temperature (32° F.) but to oscillate at intermediate temperatures, causing the lamp to flash.

The motorist will then be warned of a falling ground temperature by the flashing lamp and will know, once the lamp stays alight, that he can expect ice on the road.

The said temperature-sensitive element can be a transistor operated with an open circuit base or with its base-emitter voltage held constant. The bistable circuit should be a transistor circuit taking little power from the battery of the vehicle. A change in the resistance between the emitter and collector electrodes with change in temperature can be used to operate the lamp. It is also envisaged that a change in the voltage between the base and the emitter can be used when the base is open circuit.

In accordance with the invention a temperature-indicating device which may be used on a motor vehicle to indicate temperature conditions near the ground to the driver includes a temperature-sensing transistor so connected that its collector voltage is dependent upon the ambient temperature, an indicator device, and a second transistor having its base connected to the temperature-sensing transistor in such a manner that outside a predetermined range of temperatures the voltage applied to the base of the second transistor is such that the second transistor is cut-off or bottomed, the indicator device and the two transistors being connected in a bistable circuit which is in one state when the second transistor is cut off and another state when the second transistor is bottomed and which oscillates between the two states when the temperature is within the predetermined range and the second transistor is between the cut-off and bottomed conditions and the indicator device being so arranged in the circuit that it is on in one state of the circuit and off in the other state.

Such a device can also be applied in aircraft to give a warning of external icing conditions; in refrigerators to give a remote indication of a critical temperature; in orchards to give an indication of frost and/or to set frost dispersal apparatus into operation; and on roads to warn motorists of icing conditions particularly on bends in a road.

Figure 2:
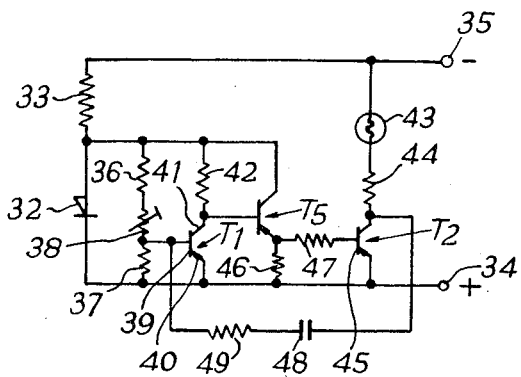

By way of example the circuits of two indicating devices in accordance with the invention are shown in FIGS. 1 and 2 of the accompanying drawings.

FIG. 1 shows a circuit in which a temperature-sensing pnp transistor $T_1$ has its emitter 10 connected to the positive terminal 11 of a vehicle battery and its collector 12 connected to the negative terminal 13 through a resistor 14. The base 15 of the transistor $T_1$ is left floating, that is unconnected or on open circuit.

The transistor $T_1$ is mounted on the chassis of a motor car at about four inches above the ground and is connected by flexible leads to the rest of the circuit, which is mounted under the bonnet of the car.

The transistor $T_1$ and resistor 14 form two arms of a bridge circuit, the other arms of which are formed by resistors 16 and 17 connected in series between the terminals 11 and 13. The out-of-balance current of the bridge is sensed by a second transistor $T_2$ whose base 18 is connected to the collector 12 of the temperature-sensing transistor $T_1$ and whose emitter 19 is connected to the junction of the resistors 16 and 17. The collector 20 of the transistor $T_2$ is connected to the negative terminal 13 through resistors 21 and 22.

Two pnp transistors $T_3$ and $T_4$ form a Schmitt trigger circuit. They have a common emitter load resistor 23. The transistor $T_3$ has a collector load resistor 24. The base of the transistor $T_3$ is connected to the collector 20 of the transistor $T_2$. The collector of the transistor $T_3$ is connected through a resistor 25 to the base of the transistor $T_4$ and the base of $T_4$ is connected to the positive terminal 11 through a resistor 26. The collector of the transistor $T_4$ is connected through a lamp 27 and a resistor 23 to the negative terminal 13 and by a feedback connection through a capacitor 29 to the junction of the resistors 21 and 22. A switch 30 is arranged in shunt with the resistor 28.

When the ambient temperature around the temperature-sensing transistor $T_1$ is high the current between the emitter 10 and collector 12 is also high. The voltage on the collector 12 is consequently close to that of the positive terminal 11 and the second transistor $T_2$ is cut-off. The voltage on the collector 20 of the transistor $T_2$ therefore tends towards that of the negative terminal 13 and as a result the third transistor $T_3$ conducts. The consequent low collector voltage of $T_3$ keeps the fourth transistor $T_4$ in the non-conducting condition and the lamp 27 is consequently off.

As the ambient temperature falls the voltage on the collector 12 of $T_1$ rises and when the temperature reaches a first predetermined value, which in this case is arranged to be 36° F., the collector voltage of $T_1$ reaches such a value that $T_2$ begins to conduct. The drop in the collector voltage of $T_2$ causes a slight decrease in the current through $T_3$ and a slight increase in the current through $T_4$. The drop in the collector voltage of $T_4$ is passed by way of the capacitor 29 and the resistor 21 to the base of $T_3$, thus assisting the change due to the change in collector voltage of $T_2$ and causing the circuit to enter into a relaxation oscillation between two states, in one of which $T_4$ is conducting and the lamp 27 is energised and in the other of which $T_4$ is non-conducting and the lamp is off. The lamp therefore flashes with a period of about one second, which is the period of oscillation of the bistable circuit.

When the ambient temperature has dropped still further to a second predetermined value, which in this case is 32° F., the collector voltage of $T_1$ reaches such a value that $T_2$ is bottomed and $T_3$ is then cut-off. $T_4$ is now conducting and maintains the lamp 27 alight continuously.

It will be apparent from the above description that when the lamp is off it indicates that the temperature is above 36° F. When it is flashing the temperature lies between 32° F. and 36° F. When it is continuously on the temperature is below 32° F. The device thus gives the motorist clear warning of the onset of icing conditions.

The switch 30 enables the resistor 28 to be shorted out or left in series with the lamp 27 so that two brightnesses of the lamp are available. A switch 31 is connected in series with the transistor $T_1$ for testing purposes.

In the circuit shown in FIG. 2 the temperature-sensing transistor $T_1$ is connected in such a manner that its base-emitter voltage is maintained constant. This is done by means of a Zener diode 32 connected in series with a resistor 33 between the positive terminal 34 and the negative terminal 35 and a potential divider consisting of fixed-value resistors 36 and 37 and a variable resistor 38 connected in series across the diode 32. The base 39 of $T_1$ is connected to the junction of resistors 37 and 38. The emitter 40 of $T_1$ is connected to the positive terminal 34 and the collector 41 of $T_1$ is connected through a collector load resistor 42 to the junction of the diode 32 and the resistor 33.

The second transistor $T_2$ has its emitter-collector circuit connected in series with a lamp 43 and a resistor 44 between the terminals 34 and 35. Connection between the collector 41 of $T_1$ and the base 45 of $T_2$ is effected by means of a transistor $T_5$ connected as an emitter follower with an emitter load resistor 46 and of a resistor 47. A feed-back connection between the collector of $T_2$ and the base 39 of $T_1$ includes a capacitor 48 and a resistor 49.

The collector current and hence the collector voltage of the temperature-sensing transistor $T_1$ is a function of the ambient temperature, as in the device of FIG. 1. Any change in the collector voltage of $T_1$ causes a corresponding change in the emitter voltage of $T_5$ which changes the current flowing into the base of $T_2$ and hence the collector current of $T_2$. The circuit values are so chosen that at 36° F. the second transistor is just cut off so that no current flows through the lamp 43 and when the temperature has fallen to 32° F. the resultant rise in the collector voltage of $T_1$ and the voltage across the emitter load resistor 46 of $T_5$ has brought $T_2$ into the bottomed condition in which it maintains the current to the lamp 43. When the temperature is between 32° and 36° F. the transistor $T_2$ is between its cut-off and bottomed conditions and acts as a grounded-emitter amplifier with a gain which is greater than unity. The feedback through the capacitor 48 and resistor 49 then causes the circuit to enter into a relaxation oscillation in which the lamp is periodically supplied with current. When the temperature is just below 36° F. the lamp flashes on for a fraction of a second every second and when the temperature is just above 32° F. the lamp flashes off for a fraction of a second every second.

The resistor 44 can be made variable to enable the brightness of the lamp to be altered.

It will be apparent that in both of the devices described the lamp 27 or 43 could be replaced by other indicator devices such as an audible warning device or a visual warning device operated by a relay.

I claim:
1. A temperature-indicating device comprising:
   (a) a temperature-sensitive transistor so connected that its collector voltage is dependent upon the ambient temperature,
   (b) an indicator device,
   (c) a second transistor,
   (d) first means connecting said temperature-sensitive transistor to said second transistor to cause said second transistor to be in a first stable state when the temperature is above a first level, to be in a second stable state when the temperature is below a second and lower level and to oscillate between the said two stable states when the temeprature is between said first and second levels; and,
   (e) second means connecting said second transistor to said indicator device to cause said indicator device to be switched on when said second transistor is in one of said stable states, to be switched off when said second transistor is in the other of said stable states and to be alternately switched on and off when said second transistor oscillates between said stable states.

2. A device according to claim 1, wherein the collector current of said second transistor is cut-off when in one of said stable states and said second transistor is bottomed when in the other of said stable states.

3. A device according to claim 2, wherein said first means connects the collector of said temperature-sensitive transistor to the base of said second transistor.

4. A device according to claim 3, wherein said indicator device is a lamp connected to be switched off when the temperature is above said first level, switched on when the temeprature is below said second level and to be alternately switched on and off when the temperature is between said first and second levels.

5. A device according to claim 4, wherein said first means comprises a third transistor connected as an emitter-follower, said second means connects said indicator device in series with the collector-emitter circuit of said second transistor and a capacitor is connected between the collector of said second transistor and the base of said temperature-sensitive transistor.

6. A device according to claim 1 wherein the temperature-indicating device is adapted for use upon a motor vehicle and wherein said temperature-sensitive transistor is adapted to be positioned on the vehicle near the ground, and wherein said indicator device is a lamp.

7. A device as claimed in claim 6, wherein said temperature-sensitive transistor is connected in such a way that its base-emitter voltage is maintained constant, said means for connecting said temeprature-sensitive transistor to said second transistor comprises a third transistor connected as an emitter-follower, the collector-emitter circuit of said second transistor is connected in series with said lamp across supply terminals and a feedback connection extending from the collector of said second transistor to the base of said temperature-sensitive transistor.

References Cited by the Examiner
UNITED STATES PATENTS

| | | | |
|---|---|---|---|
| 2,696,739 | 12/1954 | Endres | 307—88.5 |
| 3,038,106 | 6/1962 | Cutsogeorge et al. | 340—233 XR |
| 3,074,410 | 1/1963 | Foster | 307—88.5 |

NEIL C. READ, *Primary Examiner.*